(12) United States Patent
Hansen

(10) Patent No.: US 9,041,410 B2
(45) Date of Patent: May 26, 2015

(54) WIND TURBINE BLADE WITH LIGHTNING PROTECTION SYSTEM

(75) Inventor: Lars Bo Hansen, Agerskov (DK)

(73) Assignee: LM Glasfiber A/S, Kolding (DK)

( * ) Notice: Subject to any disclaimer, the term of this patent is extended or adjusted under 35 U.S.C. 154(b) by 316 days.

(21) Appl. No.: 13/580,829

(22) PCT Filed: Mar. 4, 2011

(86) PCT No.: PCT/EP2011/053296
§ 371 (c)(1),
(2), (4) Date: Aug. 23, 2012

(87) PCT Pub. No.: WO2011/110492
PCT Pub. Date: Sep. 15, 2011

(65) Prior Publication Data
US 2012/0321468 A1 Dec. 20, 2012

(30) Foreign Application Priority Data
Mar. 8, 2010 (EP) .................... 10155836

(51) Int. Cl.
*G01R 29/00* (2006.01)
*F03D 11/00* (2006.01)

(52) U.S. Cl.
CPC ........... *F03D 11/0033* (2013.01); *Y02E 10/722* (2013.01); *Y02E 10/721* (2013.01)

(58) Field of Classification Search
USPC ............ 324/525, 691; 461/146 R; 416/146 R
See application file for complete search history.

(56) References Cited

U.S. PATENT DOCUMENTS

| | | | |
|---|---|---|---|
| 3,416,027 A * | 12/1968 | Amason et al. ................. | 315/36 |
| 2006/0126252 A1* | 6/2006 | Mortensen ..................... | 361/118 |
| 2008/0095624 A1 | 4/2008 | Lewke | |
| 2009/0290982 A1* | 11/2009 | Madsen et al. .................. | 416/61 |

FOREIGN PATENT DOCUMENTS

| | | |
|---|---|---|
| DE | 10228665 A1 | 5/2003 |
| DE | 10233528 A1 | 2/2004 |
| EP | 1011182 A1 | 6/2000 |
| WO | 98/18186 A1 | 4/1998 |
| WO | 00/14405 A1 | 3/2000 |
| WO | 01/77527 A1 | 10/2001 |
| WO | 2006/099880 A1 | 9/2006 |
| WO | 2007/062659 A1 | 6/2007 |
| WO | 2008/006377 A1 | 1/2008 |

* cited by examiner

*Primary Examiner* — Vincent Q Nguyen
(74) *Attorney, Agent, or Firm* — Nath, Goldberg & Meyer; Jerald L. Meyer; Sanjana Mangalagiri

(57) ABSTRACT

A wind turbine blade with a lightning protection for a blade with a shell body has at least one lightning receptor arranged freely accessible in or on a surface of the shell body surface, and a lightning down conductor electrically connected to the lightning receptor and comprising an inner conductor made of electrically conductive material imbedded in a bedding insulation made of an electrically non-conductive material. The lightning down conductor further includes a first conductive layer having a resistance in the range of 10 to 10,000 Mega Ohm per meter (MΩ/m). The first conductive layer is located in a transverse distance from the inner conductor and being electrically isolated from the inner conductor.

16 Claims, 4 Drawing Sheets

WIND TURBINE BLADE WITH LIGHTNING PROTECTION SYSTEM

This is a National Phase Application filed under 35 U.S.C. 371 as a national stage of PCT/EP2011/053296, filed on Mar. 4, 2011, and claims benefit from European Patent Application No. 10155836.9, filed on Mar. 8, 2010, the entire content of which is hereby incorporated by reference in its entirety.

TECHNICAL FIELD

The present invention relates to a wind turbine blade with a lightning protection system, wherein the blade comprises a shell body and comprises a longitudinal direction with a root end and a tip end, the blade further comprising a profiled contour including a pressure side and a suction side, as well as a leading edge and a trailing edge with a chord having a chord length extending there between, the profiled contour, when being impacted by an incident airflow, generating a lift. The lightning protection system comprises: at least one lightning receptor arranged freely accessible in or on a surface of the shell body surface, and a lightning down conductor electrically connected to the lightning receptor and comprising an inner conductor made of electrically conductive material imbedded in a bedding insulation made of an electrically non-conductive material. The invention also relates to a wind turbine comprising such wind turbine blades.

BACKGROUND

It is known to provide blades with lightning protection systems to protect them from lightning strikes. As an example, WO 96/07825 discloses a lightning protection system, in which the tip of the blade is provided with a so-called lightning receptor made of an electrically conductive material. This lightning receptor can "capture" a lightning strike and conduct the current through a lightning down conductor, said conductor extending in the longitudinal direction of the blade and being earthed via the rotor hub of the wind turbine. This system has often been shown to provide a satisfactory protection against lightning strikes.

However, there is a risk of a flashover or sparkover from the lightning receptor or lightning down conductor to areas in the blade, where water has accumulated, since polluted water is electrically conductive. In this case, lightning current heats up the water, which may cause a "steam explosion". This may result in pressure increases, which are sufficiently high to damage the blade. Flashovers may also occur because of deposits of, for example, particles from the air, salts or insects on the surface of the blades. The damages due to flashovers result in the blade having to be repaired or, in the worst case, exchanged, which is a time-consuming and expensive process, since it is complicated to repair or exchange blades, especially for offshore wind power plants.

Furthermore, there is a risk of striking the lightning down conductor (or flashovers) through the surface of the blade, which at best creates only a small hole through the surface of the blade, but often causes greater damage to the blade. For a better control of the lightning current through the blade without damage thereof, the lightning protection system may be provided with several lightning receptors (multi-receptors) or lightning down conductors along the longitudinal direction of the blade. Preferably, the lightning receptors are arranged at a maximum interval of five meters to ensure that there are no lightning strikes (or flashovers) through the surface of the blade. However, this is a comparatively expensive and complicated solution.

WO 2007/062659 provides a solution in which an inner lightning conductor is electrically insulated in its entire longitudinal extent.

US 2008/095624 discloses a rotor blade with a lightning protection system comprising an insulated down conductor, where a dielectric sheet is used as insulation.

WO 00/14405 discloses a wind turbine blade, wherein the blade comprises a blade wall including oblong strips containing carbon fibre-reinforced plastics, which are electrically connected to an inner lightning down conductor.

EP 1 011 182 discloses a wind turbine blade provided with an electrically conductive tape layer on the outer surface.

WO 01/77527 discloses a wind turbine blade comprising a lightning protection system comprising one or more internal conducting means and one or more external lightning conducting means.

WO 2008/006377 discloses a wind turbine comprising a nacelle and at least one wind turbine blade, wherein at least one of said parts comprises a conductive film layer with connection to a ground potential.

DE10228665, DE10233528 and WO 2006/099880 describe external lightning protection systems provided with a lightning down conductor and a connection piece adapted for preventing sliding discharges. The lightning down conductor has an electrical conductor embedded in an insulating casing, which in turn may be coated with a conductive layer having a resistance of up to 1 Mega Ohm per meter.

WO 98/18186 discloses a lightning conductor comprising an inner electrical conductor, an insulated layer surrounding the inner electrical conductor, and a resistive semiconductive layer surrounding the insulating layer. The semi-conductive layer has a resistance falling within the range from about 100 ohms per meter to about 100,000 ohms per meter.

U.S. Pat. No. 4,687,882 discloses a shielded power cable comprising inner and outer conductors separated by cable insulation defining a displacement current path between the conductors for high frequency currents.

DISCLOSURE OF THE INVENTION

It is an object of the invention to obtain a new wind turbine blade, which overcomes or ameliorates at least one of the disadvantages of the prior art or which provides a useful alternative.

According to the invention, this object is achieved by the lightning down conductor further comprises a first conductive layer having a resistance in the range of 10 to 10,000 Mega Ohm per meter, the first conductive layer being located in a transverse distance from the inner conductor and being electrically isolated from the inner conductor. Advantageously, the lightning down conductor is electrically connected between the lightning receptor and a ground connection. This may be carried out via a direct electrical connection and/or the use of spark gaps.

Advantageously, the first conductive layer has a resistance in the range of 10 to 10,000 Mega Ohm per meter when measured at 20 degrees Celsius. The first conductive layer may also have a resistance in the range of 10 to 10,000 Mega Ohm per meter over a temperature range from −10 degrees to 35 degrees Celsius, advantageously over a temperature range from −20 to 50 degrees Celsius, and more advantageously over a temperature range from −40 to 50 degrees Celsius.

The arrangement of the down conductor provided with the first conductive layer having a relative low conductivity helps to prevent the build-up of streamers and/or leaders. The electrical field around the inner conductor is lowered during a lightning strike by acting as a parasitic conductor. This minimises the problem with vertical streamers, which is especially present in connection with positive lightning strikes, which normally account for about 10% of lightning strikes. Such streamers and leaders are pre-stages of lightning strikes and thus, preventing their build-up also prevents lightning strikes. Moreover, the necessity of multi-receptors may be avoided. If the resistance of the conductive layer is too small, which is the case for the embodiments shown in for instance WO 2006/099880, the conductive layer may act as a lightning receptor and increasing the risk of a flashover, potentially damaging the insulation of the lightning down conductor and the wind turbine blade. On the other hand, if the sheet resistance is too large, the influence of the layer on the electric field around the lightning down conductor is insufficient to provide the needed protection. It has surprisingly found that the addition of the first conductive layers having a relative low conductivity provides a much improved, efficient protection against positive lightning strikes compared to conventional lightning protection systems and down conductors.

At its root end, the lightning down conductor is preferably connected to earth via the rotor hub so that current from a lightning strike is safely conducted from the lightning receptor to the lightning down conductor and finally to earth. However, it may be sufficient with a spark gap between the lightning down conductor and the rotor hub.

Typically, the first conductive layer is coated on an exterior of the bedding insulation. However, it is also possible to have a second bedding insulation covering the first conductive layer. This second bedding insulation may in turn be coated with a second conductive layer.

The first conductive layer extends along at least a part of the down conductor, advantageously along at least 50%, or 60% or 70% or 80% or 90% of the length of the down conductor. Advantageously, the first conductive layer may extend along the entire length of the down conductor.

According to a preferred embodiment, the shell body is made of a composite material, such as a fibre-reinforced polymer material. Advantageously, the shell body is made of an electrically non-conductive material. Thus, the reinforcement fibres are preferably not made of a metal or carbon. According to a particular advantageous embodiment, the reinforcement fibres are glass fibres. The polymer material may for instance be epoxy, polyester or vinyl ester. Thus, the shell body is in itself electrically non-conductive, thus minimising the risk of a lightning strike hitting the wind turbine blade and further minimising the risk of a flashover to the shell body.

According to one advantageous embodiment, the lightning down conductor is an inner lightning conductor extending within the shell body.

Advantageously, the lightning down conductor extends from the lightning receptor to the root end of the blade.

The bedding insulation may be of any suitable electrically non-conductive material. According to one advantageous embodiment, the bedding insulation comprises or is made of polyethylene, advantageously HDPE. The lightning down conductor may further comprise a layer of semi-conductive material between the inner conductor and the bedding insulation.

According to one embodiment, the resistance of the first conductive layer is in the interval of 50 to 10,000 Mega Ohm per meter, or 100 to 10,000 Mega Ohm per meter, or 250 to 10,000 Mega Ohm per meter, 350 to 10,000 Mega Ohm per meter, or in the range of 500 to 10,000 Mega Ohm per meter. In practice, it has shown that the for a bedding insulation having a thickness of 4.5 mm that the resistance of the first conductive layer should be at least 350 Mega Ohm/m in order to obtain the desired effect. However, it is expected that lower resistance (or equivalently higher conductivity) may be used, if the bedding insulation is thicker. The resistance may exhibit values in the above mentioned ranges when measured at 20 degrees Celsius. Yet again, the resistance may exhibit the values over the afore-mentioned temperature intervals.

Advantageously, the first conductive layer is located at a distance of at least 3 mm from the inner conductor, or at a distance of at least 4 mm from the inner conductor, or at least 5 mm from the inner conductor. In other words, the bedding insulation may have have a thickness of at least 3 mm, or 4 mm, or 5 mm. It is also contemplated that the distance from the inner conductor may be at least 6, 7, 8, 9 or 10 mm.

However, there may also be an upper limit for the distance between the inner conductor and the first conductive layer in order to obtain the desired effect. Therefore, according to another advantageous embodiment, the first conductive layer is located at a distance of less than 10 cm from the inner conductor, or less than 7 cm from the inner conductor, or less than 4 cm from the inner conductor. In other words, the bedding insulation may have a thickness of less than 10 cm, or 7 cm or 4 cm. Said distance may even be less than 3 cm from the inner conductor, or less than 2 cm from the inner conductor.

Advantageously, the at least one lightning receptor is arranged at or in the immediate vicinity of the tip of the blade. Thereby, the lightning receptor will be located at a high position, when the wind turbine blade is pointing upwards, thus maximizing the probability of a lightning strike hitting the lightning receptor instead of another part of the blade. However, in principle the down conductor according to the invention may also be combined with a multi-receptor solution, where a plurality of lightning receptors are used, and one or more lightning down conductors are used.

The lightning down conductor may for instance be used in any of the proposed solutions disclosed in WO 2007/062659 by the present applicant. The disclosed embodiments of that patent application all comprises internal down conductors. However, in principle, the solution may also be applied to an outer, insulated down conductor or a solution, where the down conductor is embedded in the shell body of the blade.

According to one embodiment, the first conductive layer is divided into different sections having different resistance. Thus, the sections have different conductivities. The resistance may for instance be continuously or stepwise increasing or decreasing in the longitudinal direction (from the tip end towards ground).

According to a second aspect, the invention provides a wind turbine having a rotor comprising a number of blades, advantageously two or three, according to any of the preceding claims.

According to a third, broader aspect, the invention provides a lightning down conductor comprising an inner conductor made of electrically conductive material imbedded in a bedding insulation made of an electrically non-conductive material, wherein the lightning down conductor further comprises a first conductive layer having a resistance in the range of 10 to 10,000 Mega Ohm per meter, the first conductive layer being located in a transverse distance from the inner conductor and being electrically isolated from the inner conductor. Any of the afore-mentioned embodiments are suitable for the lightning down conductor.

According to a fourth aspect, the invention provides a lightning protection system comprising a lightning down conductor according to said third aspect, a lightning receptor and a ground connection, wherein the down conductor is electrically connected between the lightning receptor and the ground connection. The lightning protection system may for instance be used for wind turbines in general, e.g. by mounting the lightning receptor on top of a nacelle of the wind turbine. The lightning system may also be used for houses and other buildings. The lightning receptor may for instance be mounted on top of a roof of the house or building, and the down conductor may for instance be located in the exterior walls of the house or building.

BRIEF DESCRIPTION OF THE DRAWINGS

The invention is explained in detail below with reference to an embodiment shown in the drawings, in which.

DETAILED DESCRIPTION OF THE INVENTION

Figure 1:
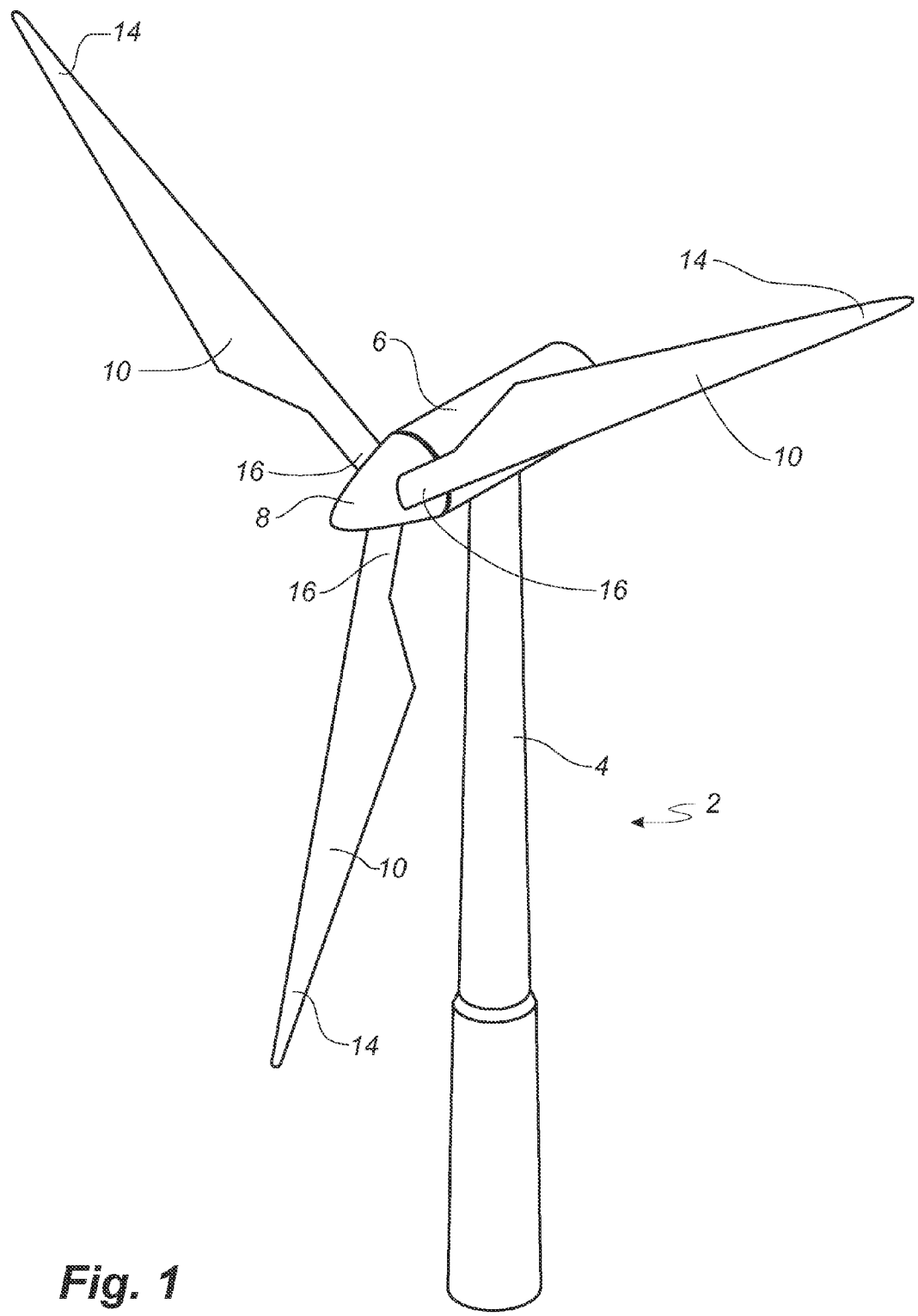
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 furthest from the hub 8.

Figure 2:
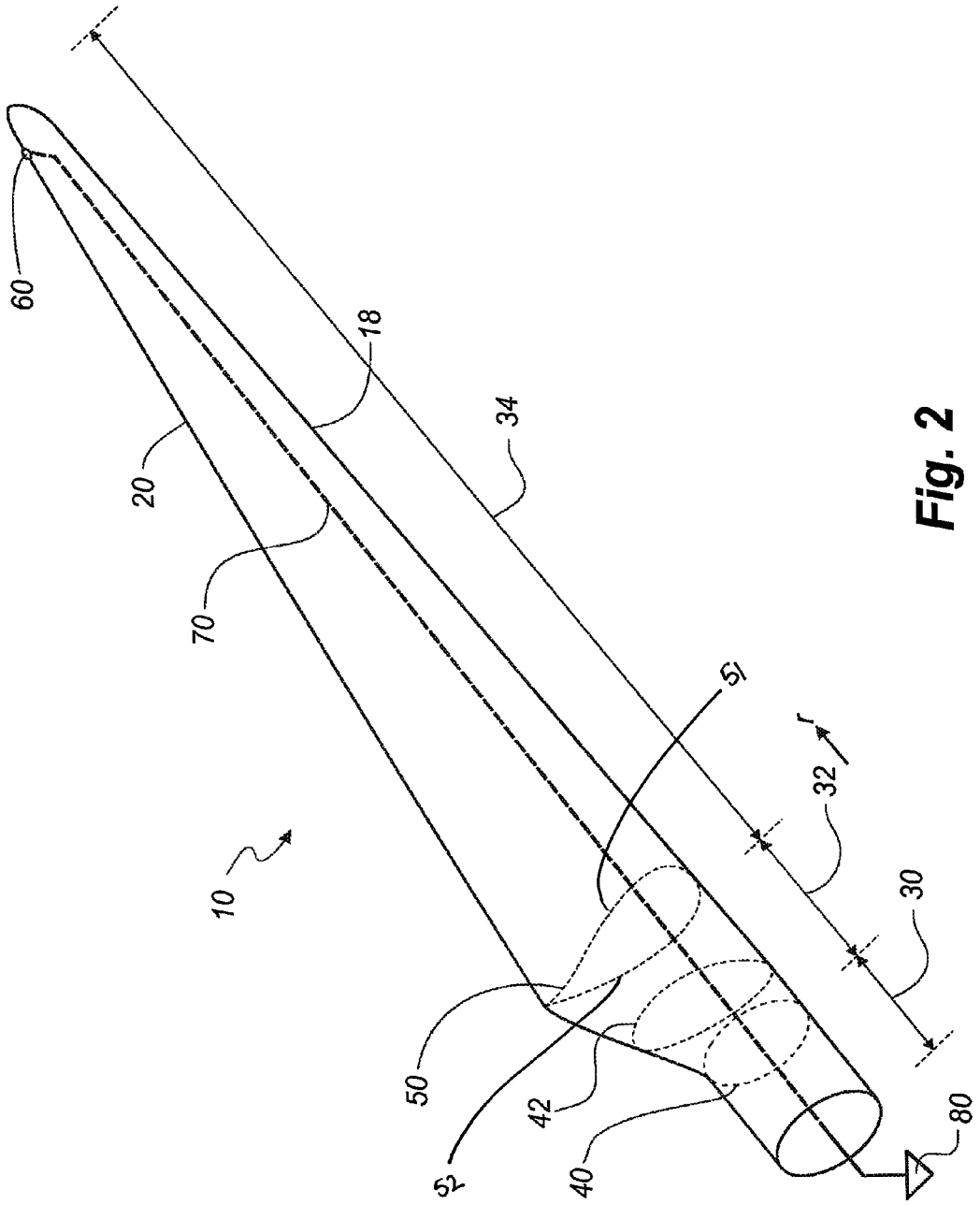
FIG. 2 shows a first embodiment of a wind turbine blade according to the invention.

FIG. 2 shows a schematic view of a first embodiment of a wind turbine blade 10 according to the invention. The wind turbine blade 10 has the shape of a conventional wind turbine blade and comprises a root region 30 closest to the hub, a profiled or an airfoil region 34 furthest away from the hub and a transition region 32 between the root region 30 and the airfoil region 34. The blade 10 comprises a leading edge 18 facing the direction of rotation of the blade 10, when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 is typically constant along the entire root area 30. The transition region 32 has a transitional profile 42 gradually changing from the circular or elliptical shape 40 of the root region 30 to the airfoil profile 50 of the airfoil region 34. The width of the transition region 32 typically increases substantially linearly with increasing distance r from the hub.

The airfoil region 34 has an airfoil profile 50 with a chord extending between the leading edge 18 and the trailing edge 20 of the blade 10. The width of the chord decreases with increasing distance r from the hub.

The chords of different sections of the blade normally do not lie in a common plane, since the blade may be twisted and/or curved (i.e. pre-bent), thus providing the chord plane with a correspondingly twisted and/or curved course, this being most often the case in order to compensate for the local velocity of the blade being dependent on the radius from the hub.

The wind turbine blade 10 is provided with a lightning protection system comprising a lightning receptor 60 arranged at the trailing edge 20 of the blade 10 near the tip end of the blade 10. An inner lightning conductor 70 extends within a shell body of the wind turbine blade 10 from the lightning receptor 60 to the root end of the blade and from there connected to a ground connection 80. This ground connection is typically passed through the rotor hub and/or the nacelle and via the tower to a ground spear or the like. The design of the lightning protection system is meant as an example only, and the layout may for instance be any of the embodiments shown in WO 2007/062659 or WO 96/07825, however provided with a down conductor according to the present invention.

Figure 3:
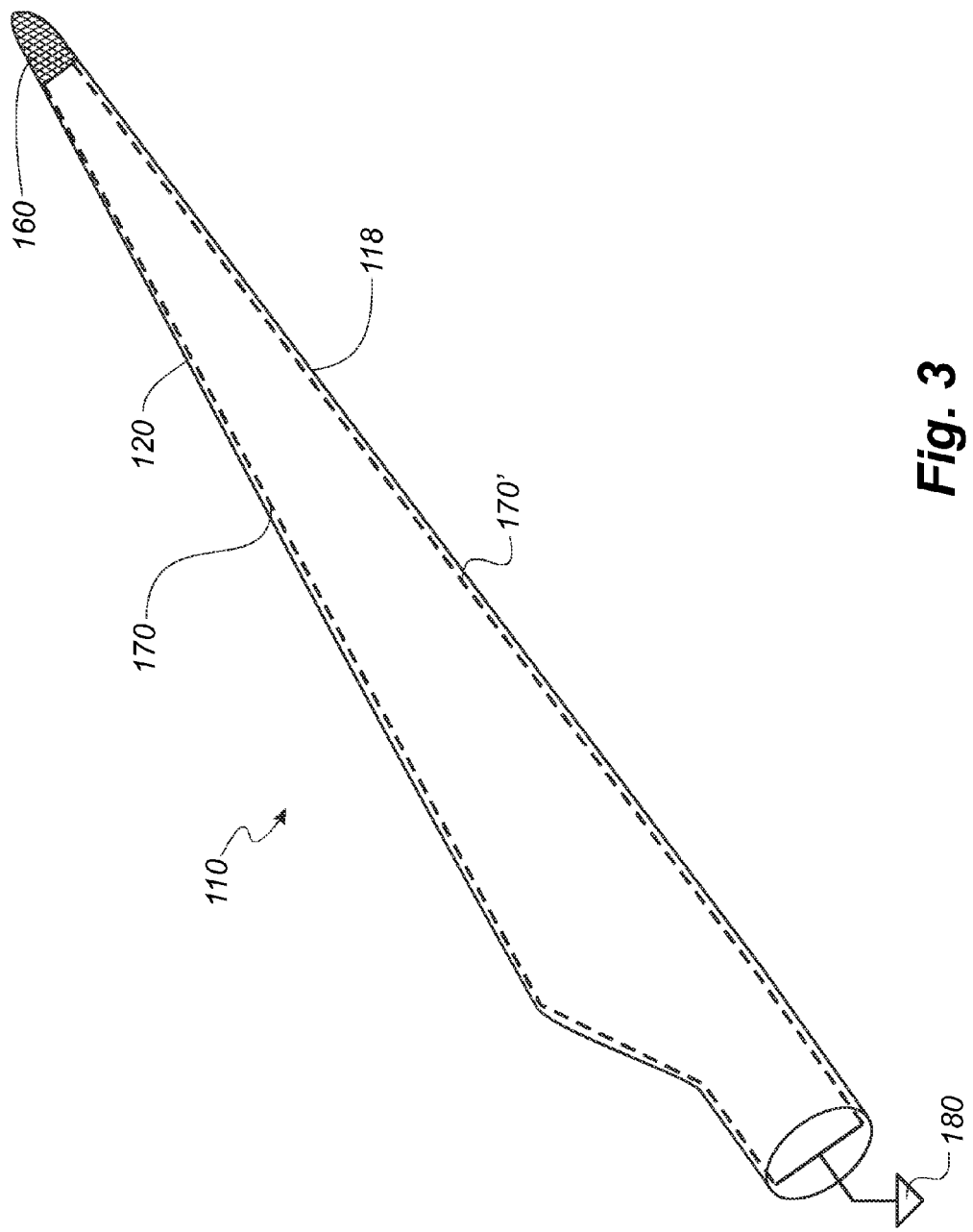
FIG. 3 shows a second embodiment of a wind turbine blade according to the invention.

FIG. 3 shows a second embodiment of a wind turbine blade 110 according to the present invention, wherein like numerals refer to like parts of the first embodiment shown in FIG. 2. In this embodiment, the tip end of the blade is provided with a lightning receptor 160 in form of an electrically conductive net made of for instance aluminium. The lightning receptor 160 is electrically connected to a first down conductor 170 and a second down conductor 170' which both in turn are connected to a ground connection 180. The first down conductor 170 is arranged near the trailing edge 120 of the blade 110, and the second down conductor 170' is arranged near the leading edge 118 of the blade 110. The down conductor may for instance be imbedded in the shell body of the wind turbine blade 110.

Figure 4:
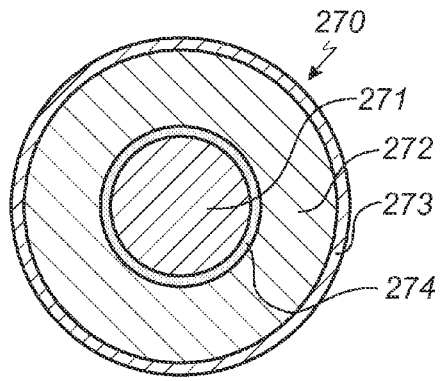
FIGS. 4-9 show cross-sections of various embodiments of lightning down conductors according to the invention.

FIG. 4 shows a cross-section of a first embodiment of a down conductor 270 according to the invention. The down conductor comprises an inner conductor 271 made of an electrically conducting material and which is covered by an insulation sheathing or bedding insulation 272 made of an electrically non-conducting material. The sheathing 272 is coated by a first conductive layer 273, which has a resistance in the interval of 10-10,000 MOhm/m and advantageously in the interval of 100-10,000 MOhm/m, i.e. a comparatively low conductivity. By providing the down conductor with such a conductive layer, the electrical field around the inner conductor is lowered during a lightning strike by acting as a parasitic conductor. However, the conductivity is so low that the layer does not function as a down conductor in itself. This minimises the problem with vertical streamers, which is especially present in connection with positive lightning strikes, which normally account for about 10% of lightning strikes. Such streamers and leaders are pre-stages of lightning strikes and thus, preventing their build-up also prevents lightning strikes. An intermediate layer 274 made of a semi-conductive material may optionally be provided between the inner conductor 271 and the sheathing 272 in order to minimise electrical field concentrations in individual wires of the inner conductor 271.

In one examined embodiment, the down conductor comprises a 50 mm$^2$ core or inner conductor 271 made of copper wires and an approx. 4.5 mm thick insulation sheathing 272 made of HDPE and with a semi-conductive material 274 provided between the inner conductor 271 and the insulation sheathing 272. In this embodiment, it was found that the resistance of the first conductive layer should be at least 350 MOhm/m in order to obtain the desired effect, i.e. a very low electrical conductivity. However, if the thickness of the sheathing 272 is increased it may be possible to use a lower resistance down to e.g. 100 Mohm/m or even 10 Mohm/m.

Figure 5:
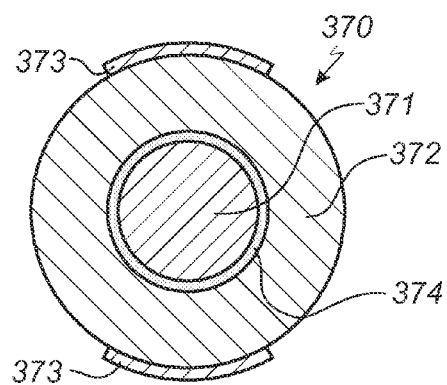
Figure 6:
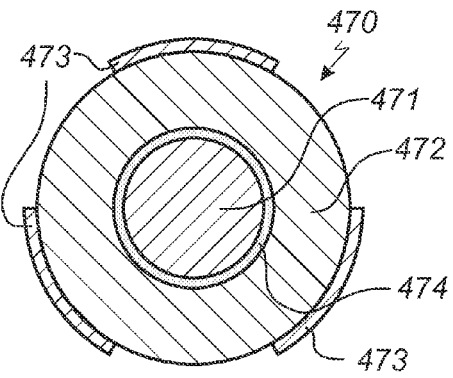
Figure 7:
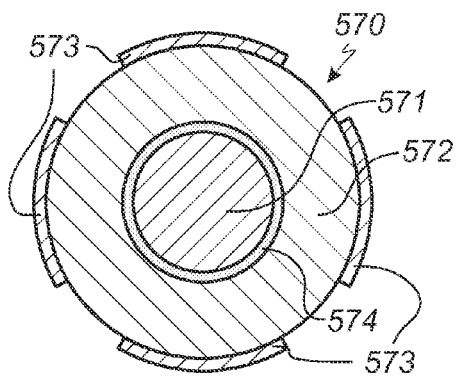

FIGS. 5, 6 and 7 shows cross-sections of a second, a third and a fourth embodiment of a down conductor according to the invention, respectively, and wherein like numerals refer to like parts of the first embodiment shown in FIG. 4. These embodiments differ from the first embodiment in that the first conductive layer is provided in strips only, the second embodiment shown in FIG. 5 having two strips, the third embodiment shown in FIG. 6 having three strips, and the fourth embodiment shown in FIG. 7 having four strips.

Figure 8:
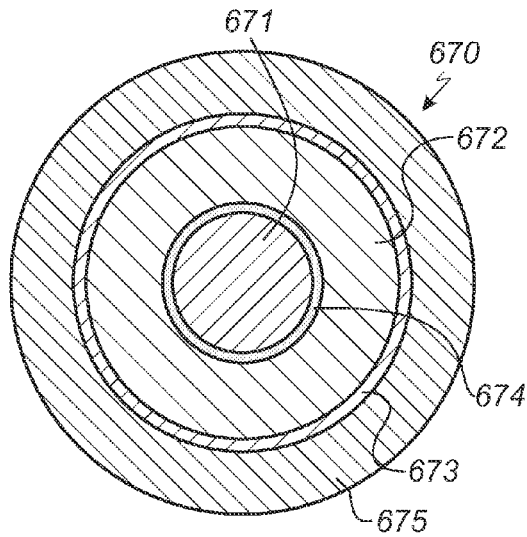

FIG. 8 shows a cross-section of a fifth embodiment of a down conductor 670 according to the invention, wherein like numerals refer to like parts of the first embodiment shown in FIG. 4. This embodiment differs from the first embodiment in that a second insulation sheathing or bedding insulation 675 is provided on top of the first conductive layer 673.

Figure 9:
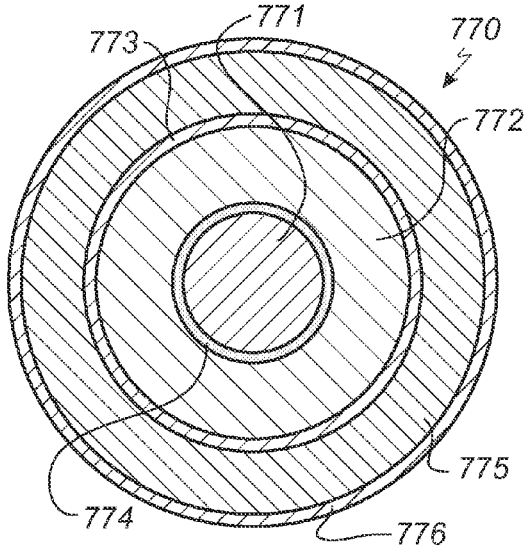

FIG. 9 shows a cross-section of a sixth embodiment of a down conductor 770 according to the invention, wherein like numerals refer to like parts of the first embodiment shown in FIG. 4. This embodiment differs from the first embodiment in that a second insulation sheathing or bedding insulation 775 is provided on top of the first conductive layer 773 on top of which a second conductive layer 776 is coated. The second conductive layer may advantageously have a lower resistance (or equivalently a higher conductivity) than the first conductive layer 772.

The embodiments of FIG. 4-8 are shown with an intermediate layer of a semiconductive material. However, it is clear from the previous description that this intermediate layer is optional only.

LIST OF REFERENCE NUMERALS 2 wind turbine
4 tower
6 nacelle
8 hub
10, 110 blade
14, 114 blade tip
16, 116 blade root
18, 118 leading edge
20, 120 trailing edge
30, 130 root region
32, 132, transition region
34, 134 airfoil region
40 circular or elliptical profile
42 transitional profile
50 airfoil profile
60, 160 Lightning receptor
70, 170, 170', 270, 370, 470, Down conductor
570, 670, 770
271, 371, 471, 571, 671, 771 Inner conductor
272, 372, 472, 572, 672, 772 Bedding insulation or sheathing
273, 373, 473, 573, 673, 773 First conductive layer
274, 374, 474, 574, 674, 774 Optional intermediate layer of semi-conductive material
675, 775 Second bedding insulation
776 Second conductive layer

The invention claimed is:

1. A wind turbine blade (10, 110) with a lightning protection system, wherein the blade comprises a shell body and comprises a longitudinal direction with a root end and a tip end, the blade (10, 110) further comprising a profiled contour, the blade having a pressure side and a suction side, as well as a leading edge (18, 118) and a trailing edge (20, 120) with a chord having a chord length extending between the leading edge and the trailing edge, the profiled contour, when being impacted by an incident airflow, generating a lift, and wherein the lightning protection system comprises:
at least one lightning receptor (60, 160) arranged freely accessible in or on a surface of the shell body surface, and
a lightning down conductor (70, 170, 170', 270, 370, 470, 570, 670, 770) electrically connected to the lightning receptor (60, 160) and comprising an inner conductor (271, 371, 471, 571, 671, 771) made of electrically conductive material imbedded in a bedding insulation (272, 372, 472, 572, 672, 772) made of an electrically non-conductive material, characterised in that
the lightning down conductor (70, 170, 170', 270, 370, 470, 570, 670, 770) further comprises a first conductive layer having a resistance in the range of 10 Mega Ohm per meter to 10,000 Mega Ohm per meter, the first conductive layer (273, 373, 473, 573, 673, 773) being located in a transverse distance from the inner conductor (271, 371, 471, 571, 671, 771) and being electrically isolated from the inner conductor (271, 371, 471, 571, 671, 771).

2. A wind turbine blade according to claim 1, wherein the first conductive layer (273, 373, 473, 573, 673, 773) has a resistance in the range of 10 Mega Ohm per meter to 10,000 Mega Ohm per meter when measured at 20 degrees Celsius.

3. A wind turbine according to claim 2, wherein the first conductive layer (273, 373, 473, 573, 673, 773) has a resistance in the range of 10 Mega Ohm per meter to 10,000 Mega Ohm per meter over a temperature range from −10 degrees to 35 degrees Celsius, advantageously over a temperature range from −20 to 50 degrees Celsius, and more advantageously over a temperature range from −40 to 50 degrees Celsius.

4. A wind turbine blade according to claim 1, wherein the shell body is made of a composite material.

5. A wind turbine blade according to claim 4, wherein the composite material is a fibre-reinforced polymer material.

6. A wind turbine blade according to claim 1, wherein the lightning down conductor (70, 170, 170', 270, 370, 470, 570, 670, 770) is an inner lightning conductor (70) extending within the shell body.

7. A wind turbine blade according to claim 6, wherein the lightning down conductor extends from the lightning receptor to the root end of the blade.

8. A wind turbine blade according to claim 1, wherein the bedding insulation comprises polyethylene.

9. A wind turbine blade according to claim 1, wherein the lightning down conductor further comprises a layer of semi-conductive material (274, 374, 474, 574, 674, 774) between the inner conductor (271, 371, 471, 571, 671, 771) and the bedding insulation.

10. A wind turbine blade according to claim 1, wherein the resistance is in the range of 50 Mega Ohm per meter to 10,000 Mega Ohm per meter, or 100 Mega Ohm per meter to 10,000 Mega Ohm per meter Mega Ohm per meter, or 250 Mega Ohm per meter to 10,000 Mega Ohm per meter, 350 Mega Ohm per meter to 10,000 Mega Ohm per meter, or in the range of 500 Mega Ohm per meter to 10,000 Mega Ohm per meter.

11. A wind turbine blade according to claim 1, wherein the first conductive layer (273, 373, 473, 573, 673, 773) is located at a distance of at least 3 mm from the inner conductor (271, 371, 471, 571, 671, 771), or at a distance of at least 4 mm from the inner conductor (271, 371, 471, 571, 671, 771), or at least 5 mm from the inner conductor (271, 371, 471, 571, 671, 771).

12. A wind turbine blade according to claim 1, wherein the first conductive layer (273, 373, 473, 573, 673, 773) is located at a distance of less than 10 cm from the inner conductor (271, 371, 471, 571, 671, 771), or less than 7 cm from the inner conductor (271, 371, 471, 571, 671, 771), or less than 4 cm from the inner conductor (271, 371, 471, 571, 671, 771).

13. A wind turbine blade according to claim 1, wherein the at least one lightning receptor (60, 160) is arranged at or in the immediate vicinity of the tip of the blade.

14. A wind turbine blade according to claim 1, wherein the first conductive layer is divided into different sections (373, 473, 573) having different resistance.

15. A wind turbine having a rotor, characterised in that the rotor comprises a number of blades, advantageously two or three, according to claim 1.

16. A wind turbine blade according to claim 1, wherein the bedding insulation comprises HDPE.

* * * * *